United States Patent [19]
Malinowski

[11] Patent Number: 6,102,131
[45] Date of Patent: Aug. 15, 2000

[54] QUICK CONNECT DOZER FRAME ASSEMBLY FOR TRACTORS AND THE LIKE

[75] Inventor: Leon Ambrose Malinowski, Yorkton, Canada

[73] Assignee: Leon-Ram Enterprises, Inc., Yorkton, Canada

[21] Appl. No.: 09/021,223

[22] Filed: Feb. 10, 1998

[30] Foreign Application Priority Data

Jun. 2, 1998 [CA] Canada ................................... 2228921

[51] Int. Cl.⁷ .................................................. A01B 51/00
[52] U.S. Cl. ......................... 172/273; 172/817; 172/274; 37/231; 37/236; 37/234; 37/270
[58] Field of Search ..................................... 172/274, 273, 172/272, 277, 814, 819, 810, 811, 817, 245, 253; 37/231, 234–236, 264, 266, 270

[56] References Cited

U.S. PATENT DOCUMENTS

| | | | |
|---|---|---|---|
| 2,867,921 | 1/1959 | Brown | 37/42 |
| 3,150,884 | 9/1964 | Drott | 280/460 |
| 3,800,882 | 4/1974 | Werts et al. | 172/273 |
| 3,982,643 | 9/1976 | MacGregor et al. | 172/273 X |
| 4,185,698 | 1/1980 | Frisbee | 172/71 |
| 4,222,442 | 9/1980 | Westendorf et al. | 172/273 |
| 4,304,305 | 12/1981 | Bartel | 172/274 |
| 4,470,211 | 9/1984 | Rossmann | 37/231 |
| 4,554,978 | 11/1985 | Schneider | 172/274 X |
| 4,615,130 | 10/1986 | Racicot | 37/231 |
| 4,817,728 | 4/1989 | Schmid et al. | 172/273 |
| 4,919,212 | 4/1990 | McClure | 172/274 |
| 4,976,053 | 12/1990 | Caley | 172/273 X |
| 5,036,608 | 8/1991 | Ciula | 172/273 X |
| 5,040,615 | 8/1991 | Fletcher | 172/273 X |
| 5,353,530 | 10/1994 | Pieper | 37/231 |
| 5,540,289 | 7/1996 | Hirooka et al. | 172/274 |
| 5,778,567 | 7/1998 | Jager et al. | 172/272 X |

FOREIGN PATENT DOCUMENTS

| | | | |
|---|---|---|---|
| 1150500 | 7/1983 | Canada | E02F 3/76 |
| 1223123 | 6/1987 | Canada | E02F 3/76 |

*Primary Examiner*—Victor Batson
*Attorney, Agent, or Firm*—Walter W. Duft

[57] ABSTRACT

A quick connect dozer frame assembly is disclosed. The frame has a plurality of attaching points which interconnect with complementary latching members on an associated tractor for quickly connecting the dozer frame thereto. For conventional framed, rear wheel drive tractors, the dozer frame extends beneath the tractor to engage a rearwardly located tractor frame member. Where the tractor is an articulated frame vehicle, the dozer frame engages latching members on side plates mounted on the tractor.

3 Claims, 12 Drawing Sheets

QUICK CONNECT DOZER FRAME ASSEMBLY FOR TRACTORS AND THE LIKE

FIELD OF THE INVENTION

This invention relates to detachably connected implements for farm tractors and more specifically to a quick connect dozer frame for such vehicles.

In the last few decades, farm tractors have increased in size and four wheel drive tractors with articulated frames have become very common. Additionally, farmers themselves have become more diversified and, as a result, tractors have evolved to become more flexible and are used for many jobs besides the traditional one of pulling implements in the field.

One implement that has been utilized for many tasks are dozer blade units which are mounted on two wheel drive, four wheel drive and articulated frame tractors. The blades are used in combination with such vehicles for grading work, plowing roads and the like. The dozer blade units are normally mounted to the tractors as a semi-permanent installation. In two wheel drive tractors, the dozers usually consist of a dozer blade, a pivoting frame which raises and lowers the blade using the tractor hydraulics, and a push frame which hangs under the tractor and transfers the pushing force to the tractor draw bar. These dozer blades can either be mounted to the tractor frame or suspended below the tractor's front axle. Conventionally, these units are installed using a mounting kit which utilizes a number of brackets and bolted connections. In some cases, brackets may be welded to the tractor as well. This is a time consuming task.

In most instances, these types of dozers are designed for the dozer blade itself to be removable while the remainder of the assembly remains on the tractor at all times. Unfortunately, it is not desirable for the assembly to be on the tractor at all times. When the tractor is used for other operations, the low ground clearance and increased front weight from one of these dozer assemblies often interferes with other field operations. As well, the tractor hydraulic outlets are required for other implements. Accordingly, most farmers find themselves being forced to remove the entire dozer push assembly and reinstall it several times throughout the season, a task that can take several hours to perform in many cases and a task that is always a difficult undertaking, particularly in inclement weather.

Four wheel drive tractors are generally much larger than the two wheel drive unit and one of their characteristics is that all of their wheels are the same size. In most cases, they are articulated frame vehicles and, because they steer by articulating one end of the frame relative to the other, this prevents the uses of a push frame to the tractor draw bar area.

The dozer units for these large tractors are understandably large and heavier than those for two wheel drive units and are much more complicated to mount. With these four wheel drive units, only the dozer blade can be removed with any degree of efficiency. However, when the push frame is left on the tractor, the problems of increased weight and reduced ground clearance still exist. As well, the tractor hydraulics are needed for other implements. Additionally, weight distribution on this type of tractor is very important for field operations. The increased weight of the dozer assembly on the front of the tractor can mean reduced traction to the rear wheels under field operations. While this can be overcome by adding weights to the rear of the tractor, it would be much more desirable and effective to remove as much of the front weight as possible.

To properly address the above problems with existing dozer blade assemblies, it is desirable to remove as much of the assembly as possible when the tractor is used for other purposes. However, the removal should not be a time and labour intensive task. Additionally, it is desirable to have a unit that can be reinstalled on a tractor quickly and easily. In general, to be successful, a dozer assembly must be able to be mounted or dismounted by a single operator in a very short period of time without the need for special tools and with a minimum amount of physical effort.

Several examples of published arrangements for connecting a dozer blade or some other implement on to a vehicle such as a tractor are disclosed in the following patent specifications. U.S. Pat. No. 4,817,728 Schmidt et al, Apr. 4, 1989 discloses an implement for detachable connection with a lawn or garden tractor.

U.S. Pat. No. 3,150,884 Drott, Sep. 29, 1964 discloses a detachable hitch having a bar attached to its associated frame and which terminates in a ball joint that connects to a receptacle on an implement.

U.S. Pat. Nos. 2,867,921 Brown, Jan. 13, 1959, 4,222,442 Westendorf et al, Sep. 16, 1980 and 4,185,698 Frisbee, Jan. 29, 1980 disclose vehicle mounted implements having connectors to vehicles and U.S. Pat. Nos. 4,554,978 Schneider, Nov. 26, 1985 and 4,919,212 McClure, Apr. 24, 1990 are also representative of forms of quick attach assemblies.

Further examples are illustrated in U.S. Pat. Nos. 4,304,305 Bartel, Dec. 8, 1981 and Hriooka et al 5,540,289 Jul. 30, 1996.

Canadian Patents 1,150,500 Jul. 26, 1983 and 1,223,123 Jun. 23, 1987 are additional examples of devices for detachably securing implement assemblies on a tractor.

For various reasons, devices as illustrated in the above mentioned specifications do not fully and adequately address the shortcomings of conventional practice in this field.

SUMMARY OF THE INVENTION

In addressing the above mentioned deficiencies in the conventional practice of attaching dozer frame assemblies to tractors, the present invention incorporates a system of connecting members which are installed on the tractor and, as they are fairly compact and do not affect field operations they remain on the tractor at all times. The dozer frame assembly has complimentary connecting members so it can be quickly connected and disconnected to and from the tractor with a minimum amount of time.

In accordance with a broad aspect, the present invention relates to a quick connect dozer frame assembly for detachable securement to a tractor or like vehicle. The dozer frame assembly comprises an implement-supporting front section and a push frame rear section. First connecting members are mounted on the push frame rear section and second connecting members are adapted for mounting on the tractor at locations thereon so as to be engagable with the first connecting members on the push frame rear section when the tractor is moved into an operative position with the dozer frame assembly.

Subsequent to engagement, means are provided for locking the first and second connecting members in their engaged position.

DESCRIPTION OF THE DRAWINGS

The invention is illustrated, by way of example, in the accompanying drawings in which.

DESCRIPTION OF THE PREFERRED EMBODIMENTS

Figure 1:
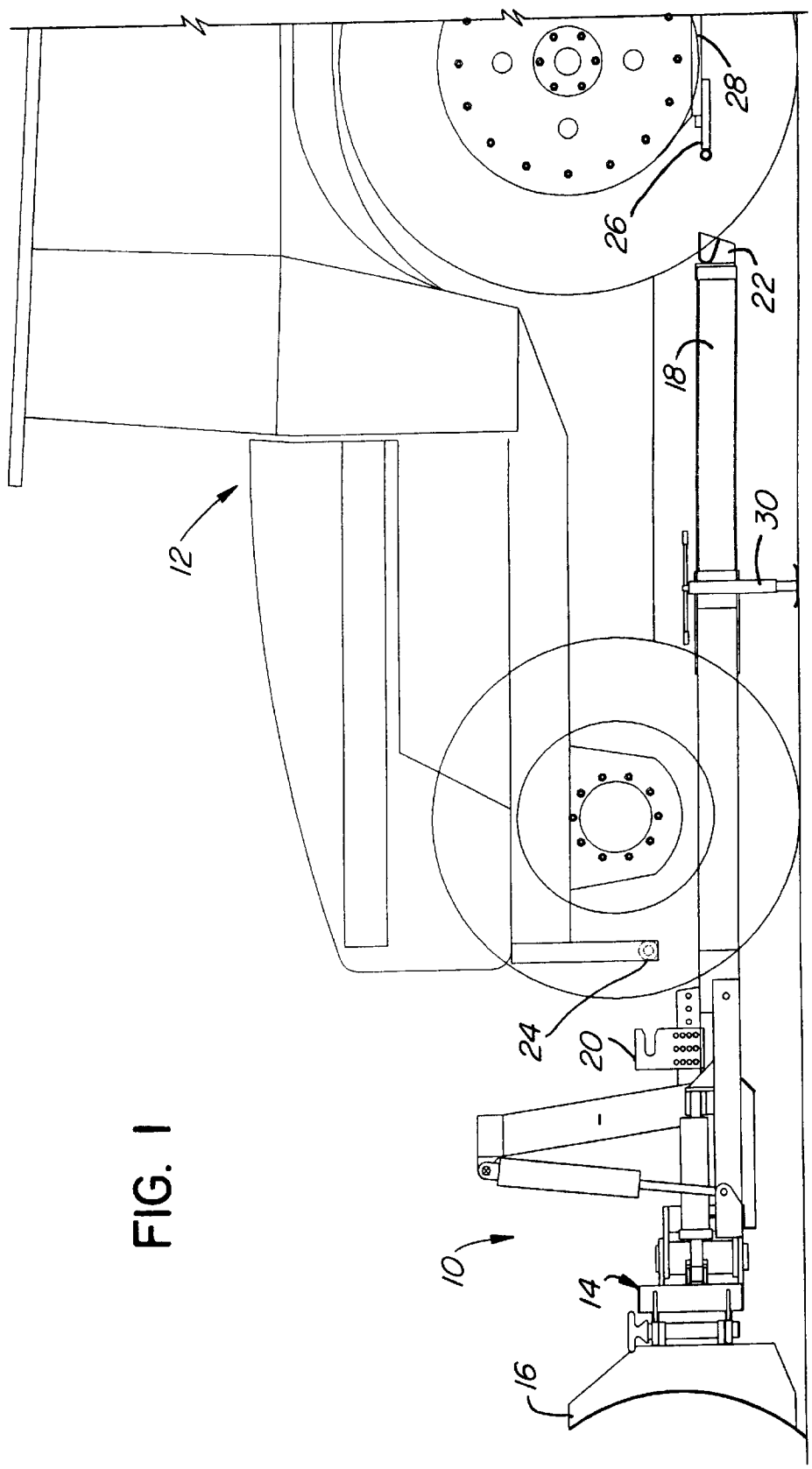
FIG. 1 is an elevation view of one embodiment of the present invention showing a dozer frame assembly in position for attachment to a tractor, in accordance with the invention.
Figure 2:
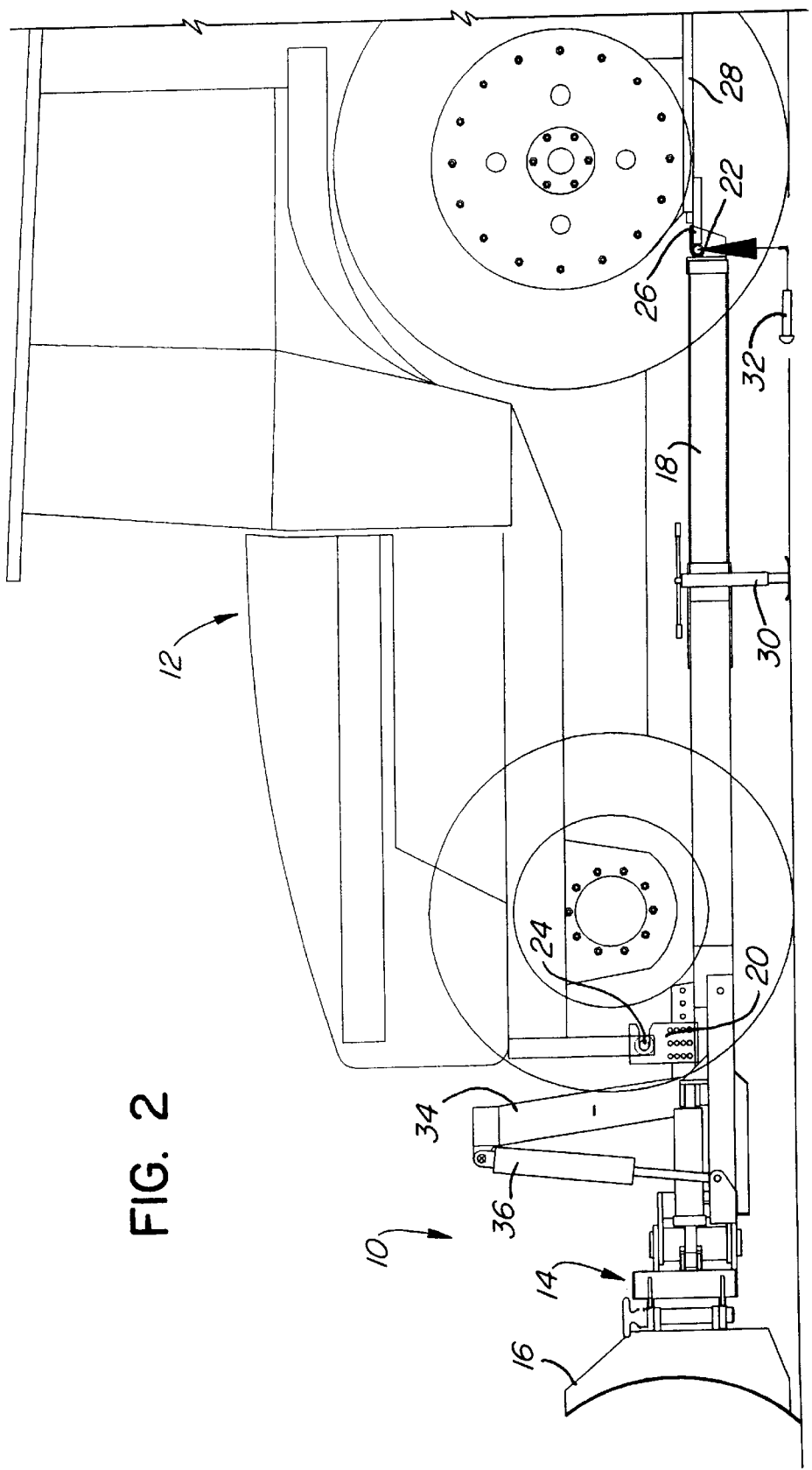
FIG. 2 is a view similar to FIG. 1 illustrating the frame assembly in engagement with the tractor.
Figure 3:
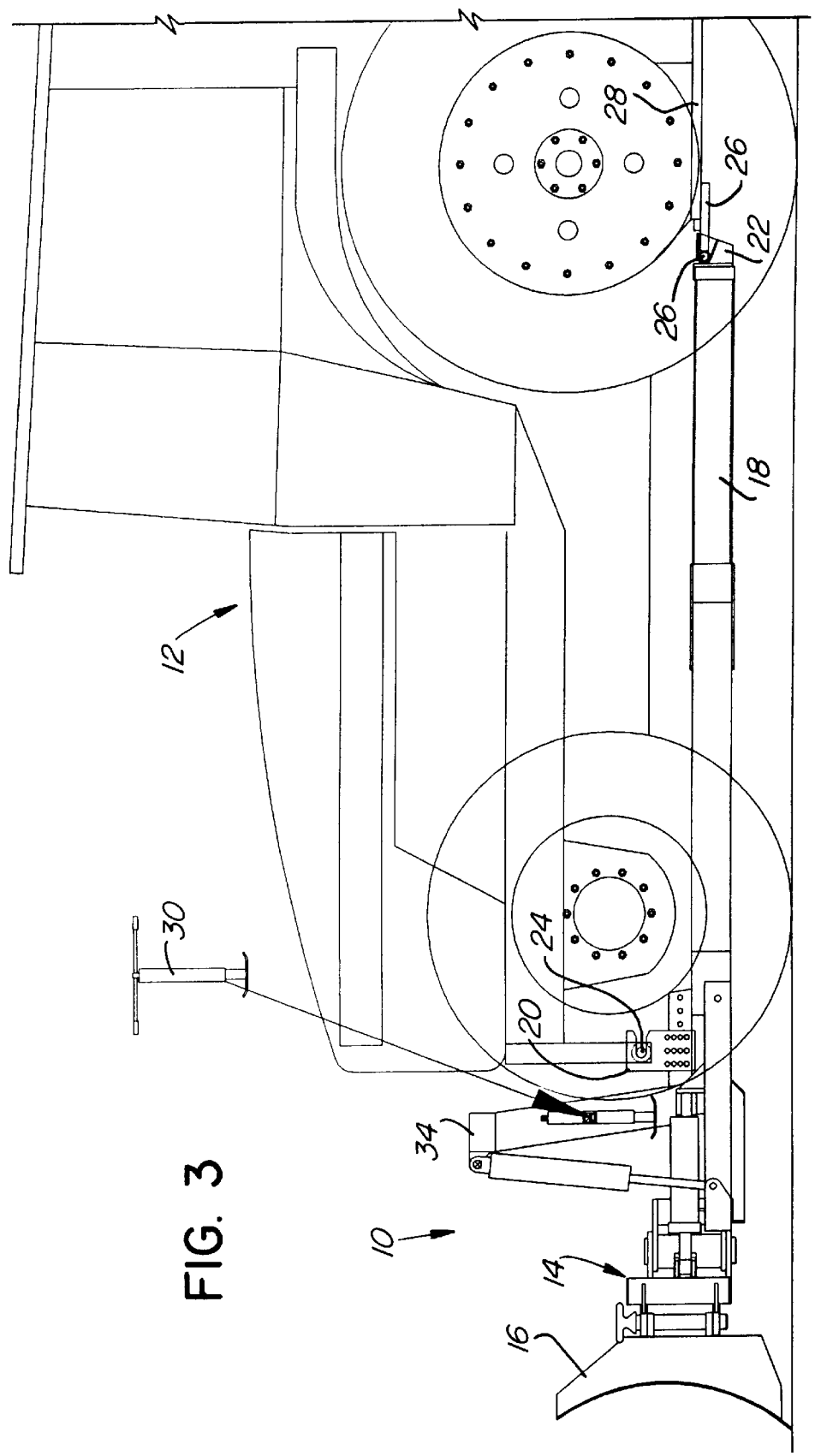
FIG. 3 is a view similar to FIG. 1 showing the assembly in operative position.

Referring to FIGS. 1 through 3 inclusive, the quick connect frame assembly is illustrated generally at 10 and is adapted to be connected to a vehicle such as a two wheel drive farm tractor 12. The frame assembly 10 has an implement-supporting front section 14 which, in the illustrated case, supports a dozer blade 16, and a push frame rear section 18. First connecting members in the form of a pair of rearwardly facing hook members 20 are mounted on the forward end of the push frame 18, one on either side thereof. A further, first connecting member is located at the inner terminal end of the push frame 18 and is in the form of a bar-receiving pocket 22.

The assembly also includes second connecting members adapted for mounting on the tractor at locations thereon so as to be engagable with the first connecting members when the tractor is moved into an operative position with the dozer frame assembly as shown in FIGS. 2 and 3. In the present embodiment, the second connecting members consist of a pair of latching bars 24, one on either side of the tractor at the front end thereof, as illustrated in FIG. 1 as well as a rear latching bar 26 which is secured to the frame of the tractor adjacent the rear thereof and extends forwardly, as shown in FIG. 1, on a push piece 28 which would be installed on the rear of the tractor in the draw bar area.

As shown in FIG. 1, the dozer frame assembly 10 is parked using a jack 30 to support the rear portion of the frame and the tractor is driven over the assembly as illustrated. The operator then connects the hydraulic hoses and adjusts the height of the push assembly using the tractor hydraulics and the jack 30 to match the elevation of the hook members 20 and pocket 22 with the latching bars 24 and 26 on the tractor. The operator then drives the tractor forward until the three points engage, the two at the front and the single pocket 22 and the bar 26 at the rear. As shown in FIG. 2, once the dozer assembly 10 is firmly in position, a lock pin 32 is installed in the pocket 22 and through the bar 26 to secure them together. The jack 30 is then removed and stored at a convenient location on the assembly, such as between the dozer uprights 34 as shown in FIG. 3 and the entire unit is then operational.

To dismount the unit, the jack 30 is reconnected, the lock pin 32 is removed and the hydraulics are disconnected. The operator then backs the tractor 12 away from the assembly which is left parked as in FIG. 1.

Figure 4:
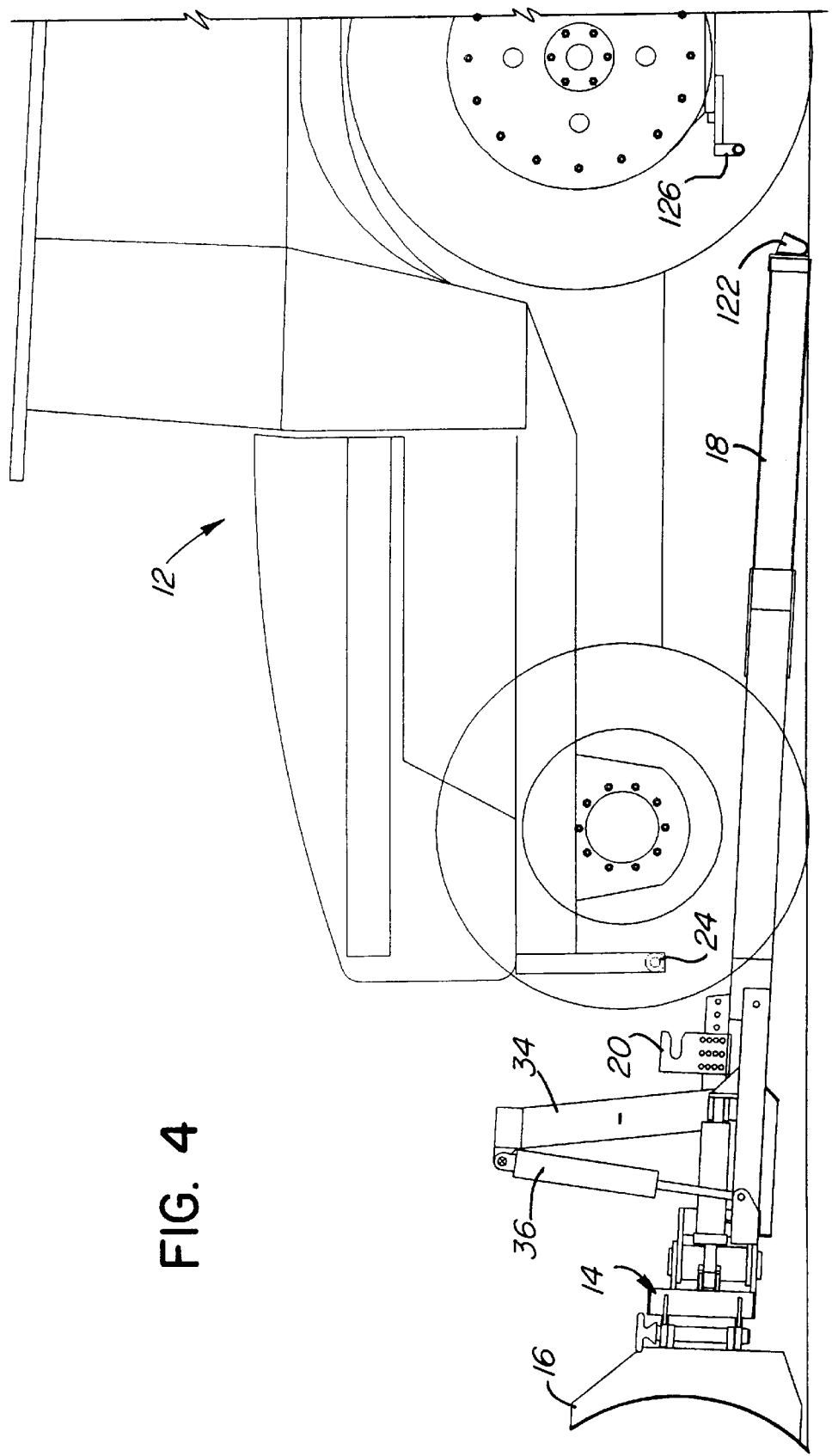
FIG. 4 is a view similar to FIG. 1 but illustrating a second embodiment of the invention.
Figure 5:
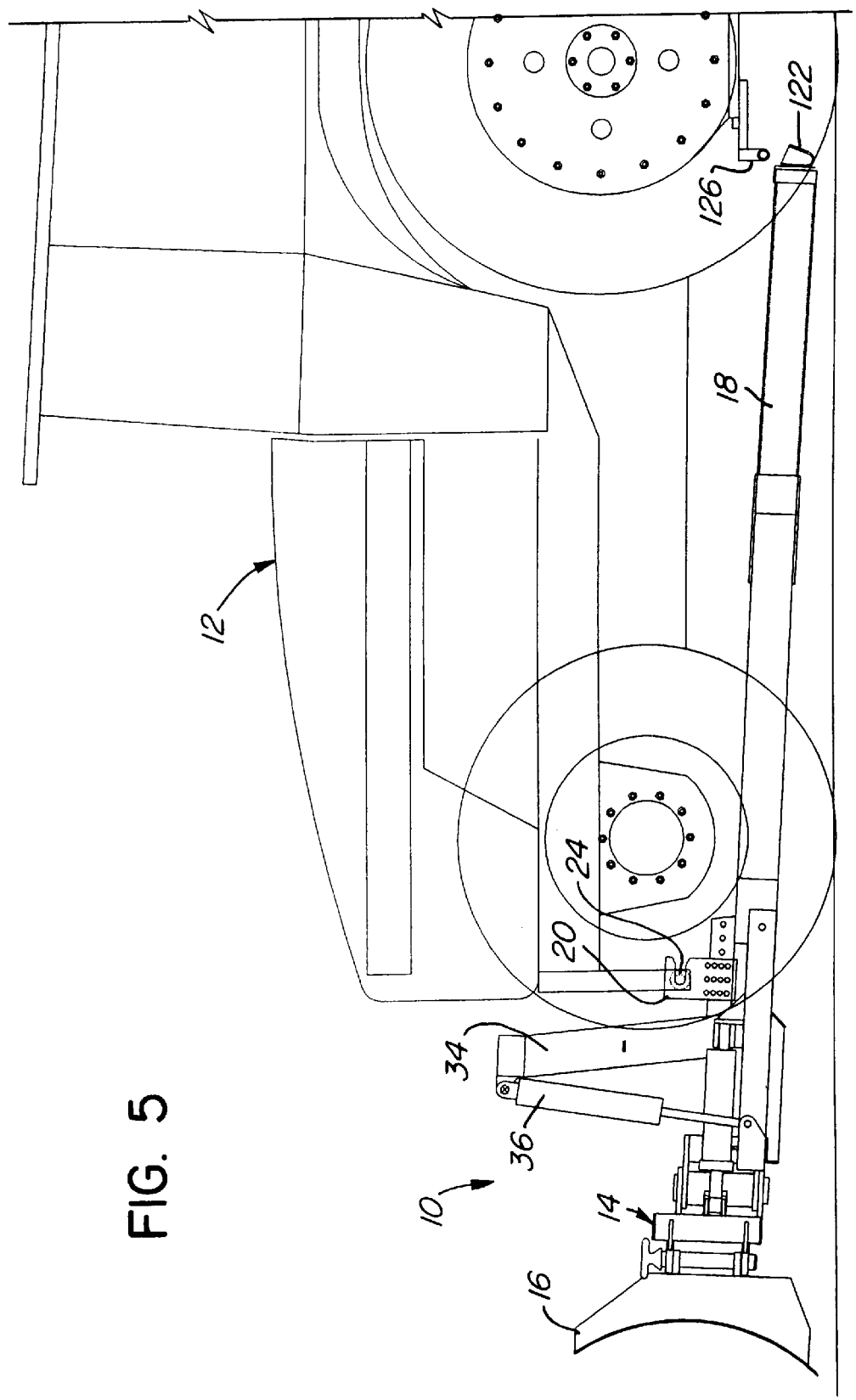
FIG. 5 is a view similar to FIG. 4 showing partial engagement of the frame assembly to the tractor.
Figure 6:
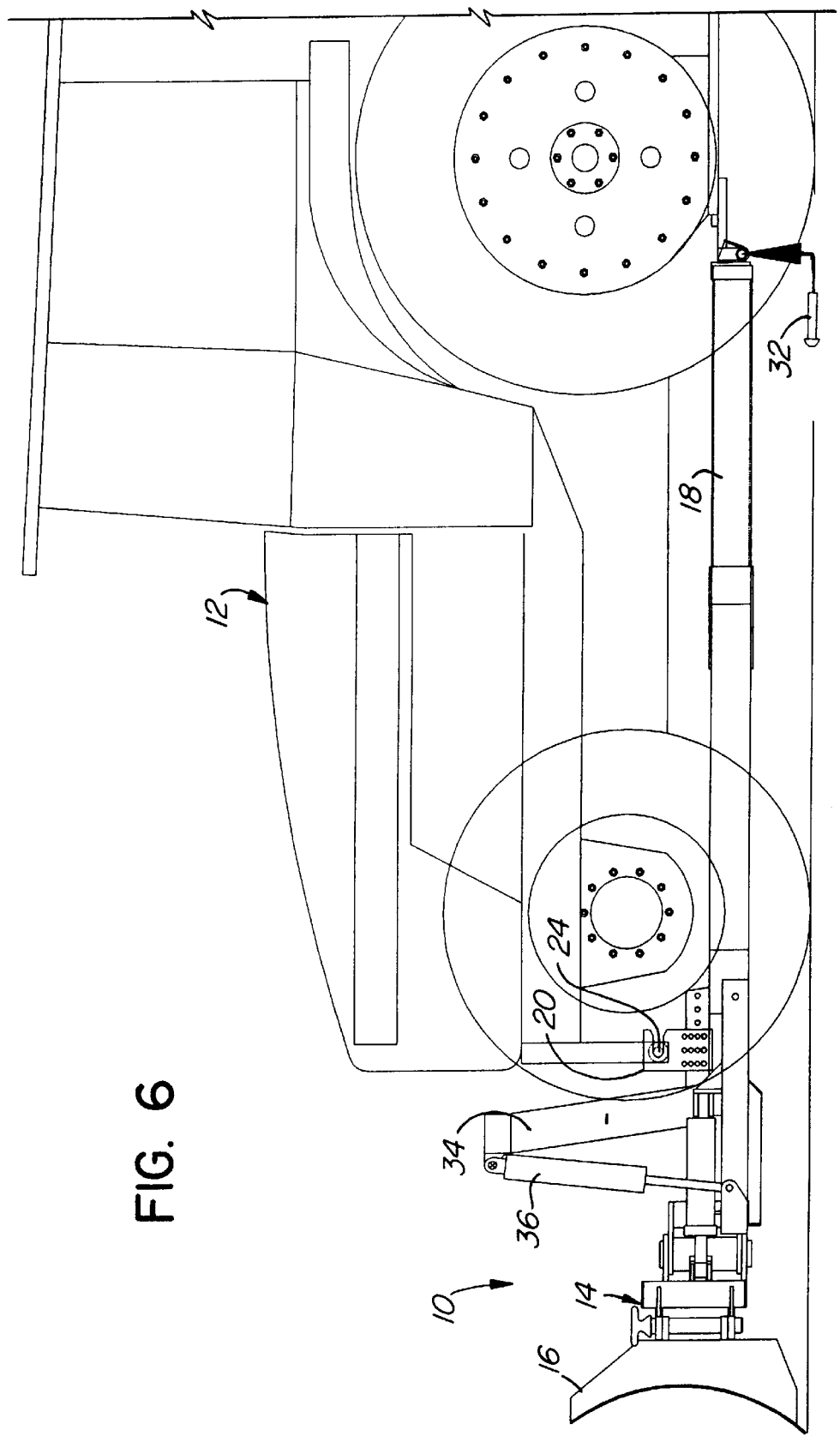
FIG. 6 is a view similar to FIG. 5 showing the complete connection of the frame assembly to the tractor.

In the embodiment illustrated in FIGS. 4, 5 and 6, the use of the jack 30 has been eliminated and the first and second connecting members between the inner terminal end of the push frame 18 and the tractor frame push piece 28 have been altered. In this embodiment, the latching bar 126 is positioned 90° downwardly from the embodiment in FIG. 1 so that it is directed downwardly as shown in FIG. 4. Similarly, the bar receiving pocket 122 has been oriented to face upwardly as shown in FIG. 4.

In this arrangement, the operator drives the tractor 12 over the assembly 10 which is laying on the ground as shown in FIG. 4. The tractor hydraulics are connected to the assembly and, using those hydraulics, the operator extends the cylinders 36 to raise the hook members 20 of the assembly 14 to match the front latching pins 24 on the tractor and then drives the tractor forward until these hook and latching members 20, 24 are engaged as illustrated in FIG. 5.

The operator then extends the cylinders 36 which will cause the dozer frame assembly 10 to pivot around the front latching pins 24 and the rear pocket will be raised upwardly to engage the rear latching bar 126. The operator then installs the lock pin 32 as shown in FIG. 6 and the unit is operational.

To dismount the unit, the operator removes the lock pin 32 and lowers the dozer assembly to the ground by means of the hydraulic cylinders 36 before disconnecting the hydraulics in reverse sequence to the above.

The embodiments of the invention illustrated in FIGS. 7 through 12 illustrate the invention in combination with tractors of the four wheel drive and/or articulated frame types. Due to the size and power of such tractors, a considerably larger and heavier unit is required and, if the tractor is of the articulated frame type, it is not possible to have a push frame attached to the draw bar area of the vehicle.

Figure 7:
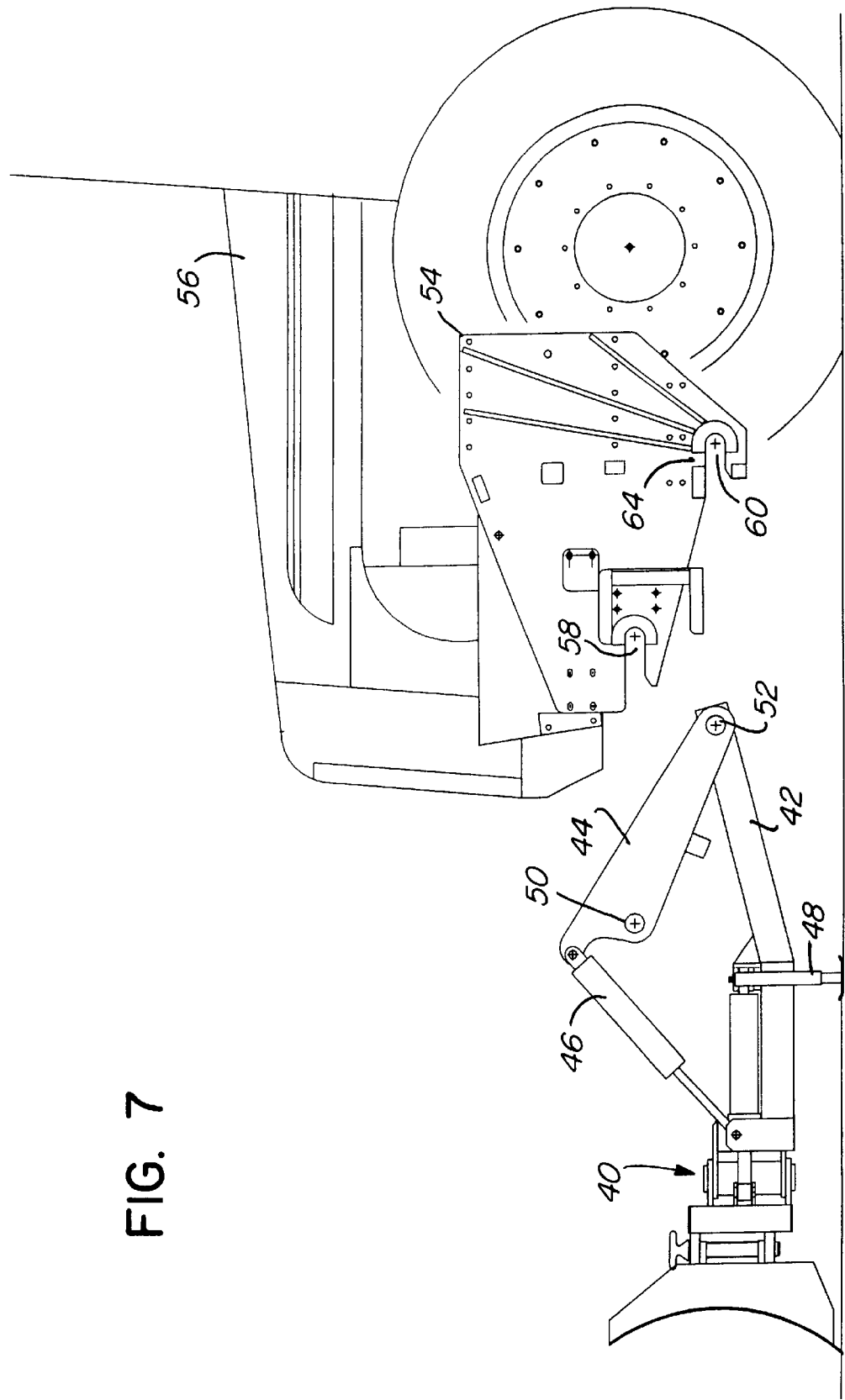
FIG. 7 is an elevation view of another embodiment of the invention with the dozer frame assembly positioned for engagement with a tractor of the four wheel drive or articulated type.

As shown in FIG. 7, the dozer frame assembly 40 is of somewhat different construction from the embodiment shown in FIG. 1 in that the rear push frame section 42 is substantially shorter and it is connected by means of side arms 44 to a pair of hydraulic cylinders 46. In the embodiment of FIG. 7, a jack 48 is utilized to elevate the assembly 40 to an engaging position.

The first connecting members in this embodiment comprise a pair of latching bars 50, 52 on either side of the push frame side arms 44.

Figure 8:
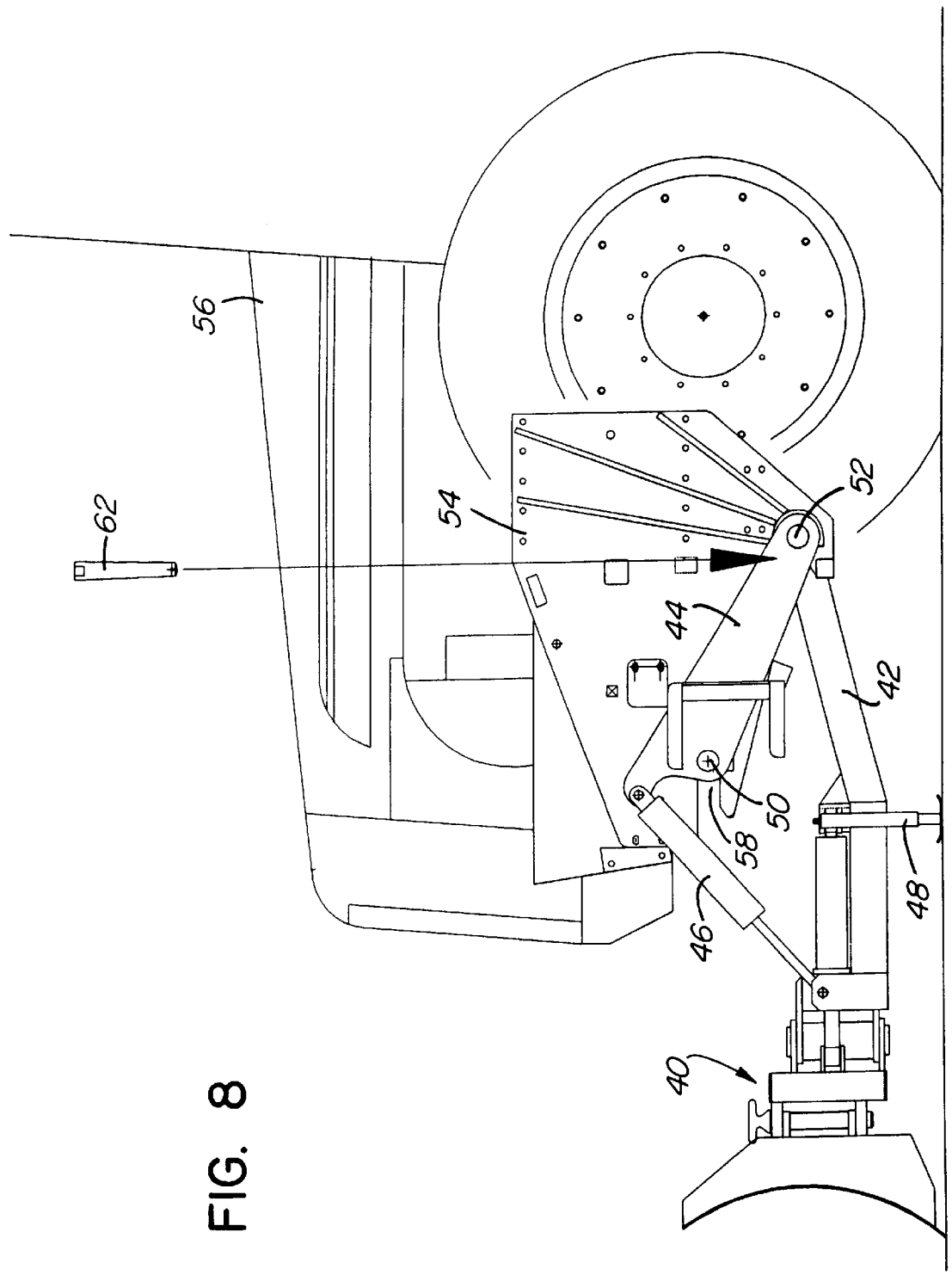
FIG. 8 is a view similar to FIG. 7 showing the units in engaged position.

A pair of side plates 54 are mounted on the tractor 56, one on either side of the front end thereof as illustrated. Each side plate 54 has upper and lower latch bar receiving sockets 58, 60 respectively and into which the latch bars 50, 52 are located when the tractor 56 is moved into an engaging position with the dozer frame assembly 40 as shown in FIG. 8. In this embodiment, the jack 48 is used to adjust the height of the assembly 40 to match the sockets on the tractor side plates 54 and the hydraulics are connected. The tractor 56 is then driven forward until the latch bars 50, 52 are engaged by the side plate sockets 58 and 60 as shown in FIG. 8. The assembly is then secured to the side plates of the tractor by using a pair of tapered pins 62, FIG. 8, which are dropped into passageways 64, FIG. 7, to secure the assembly 40 in place. The jack 48 is then removed and stored at a convenient location on the tractor as shown in FIG. 9 and the operator is able to drive the unit away.

To disconnect the unit, the jack is reattached and activated, the tapered pins 62 are removed, the tractor 56 is backed out of the assembly 40 and the hydraulics are disconnected.

Figure 9:
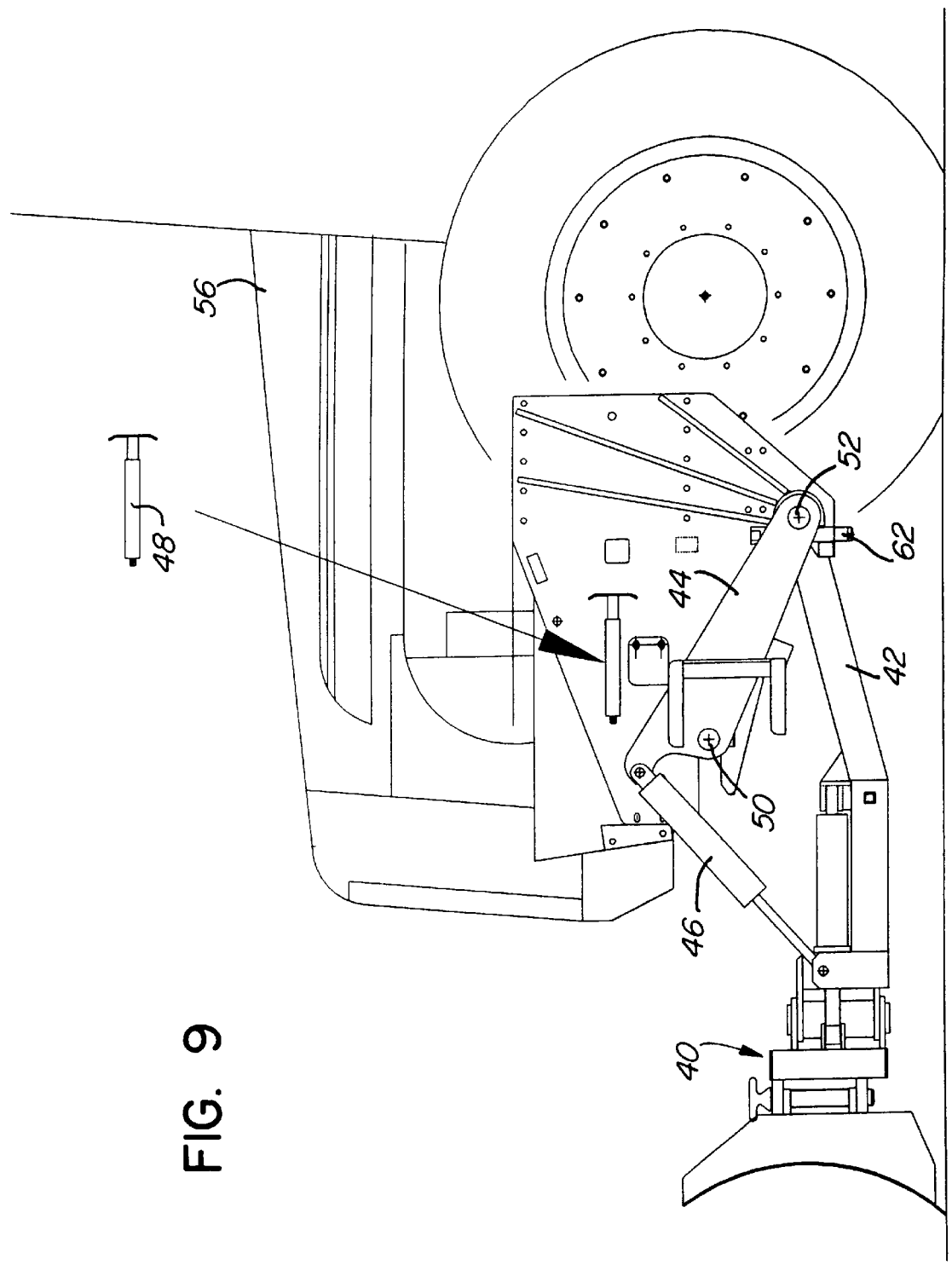
FIG. 9 is a view similar to FIG. 8 showing the units completely engaged and in operational position.
Figure 10:
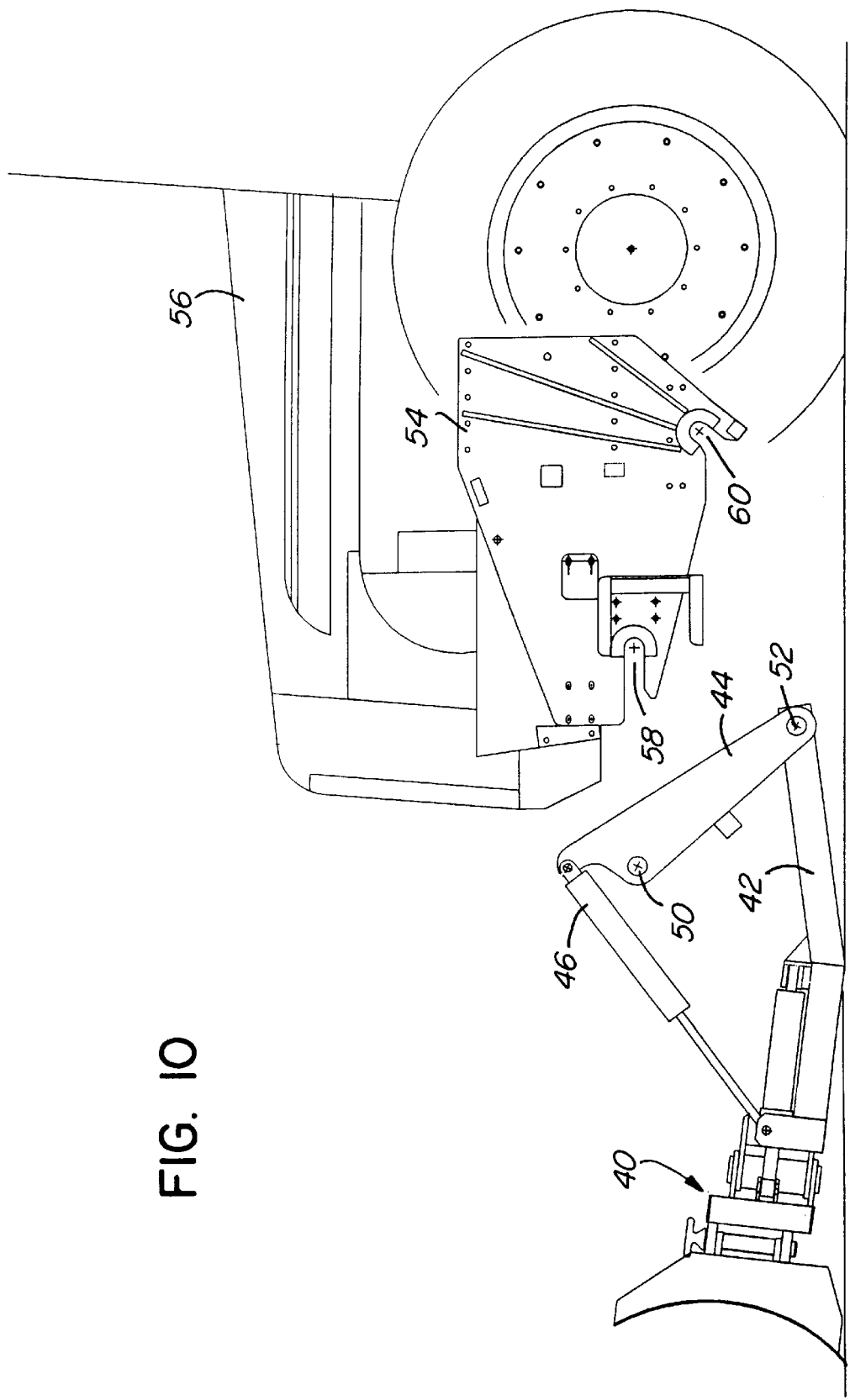
FIG. 10 is a view similar to FIG. 7 but illustrating another embodiment of the invention.
Figure 11:
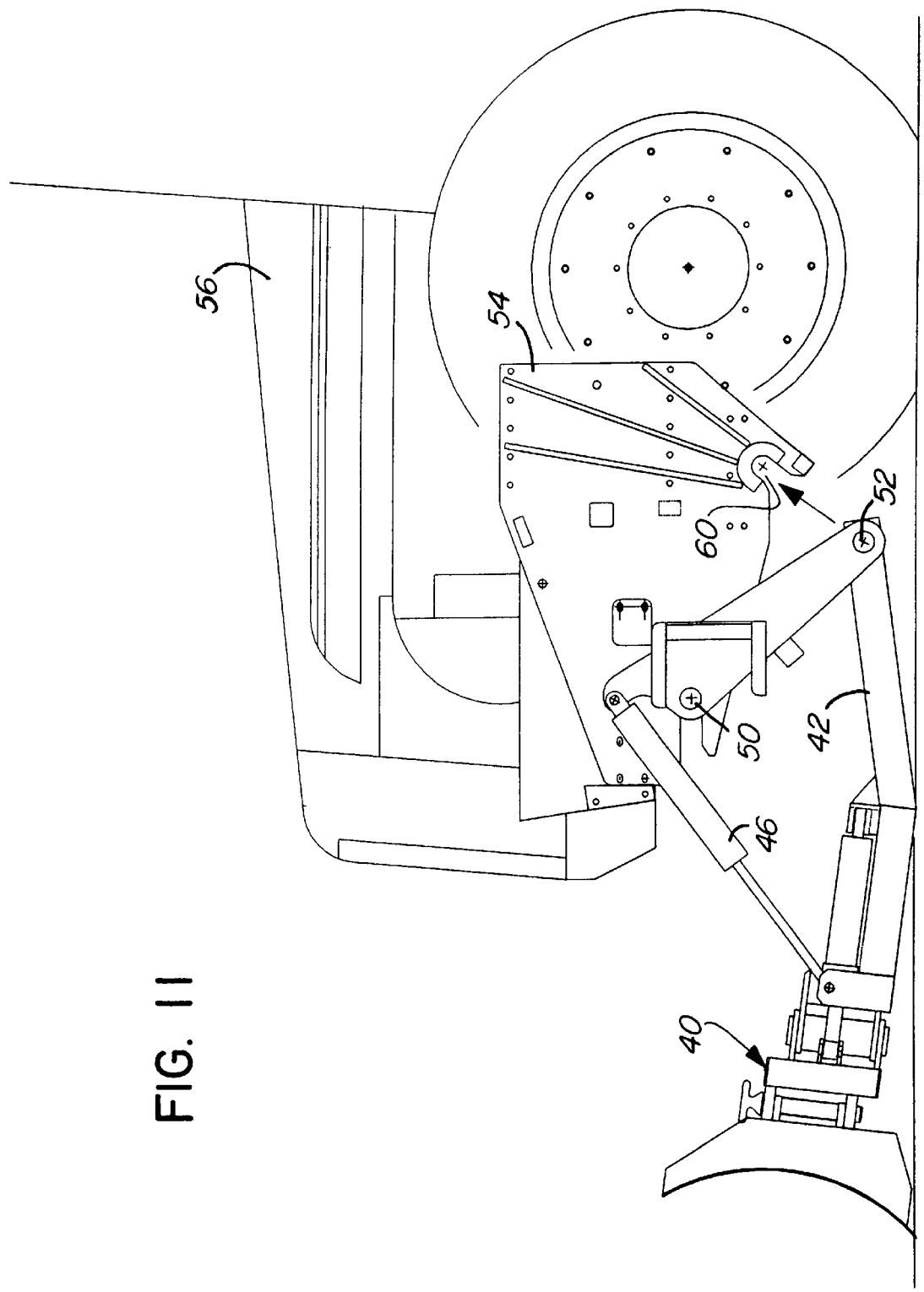
FIG. 11 is a view similar to FIG. 10 and showing the frame assembly in partial engagement with the tractor.
Figure 12:
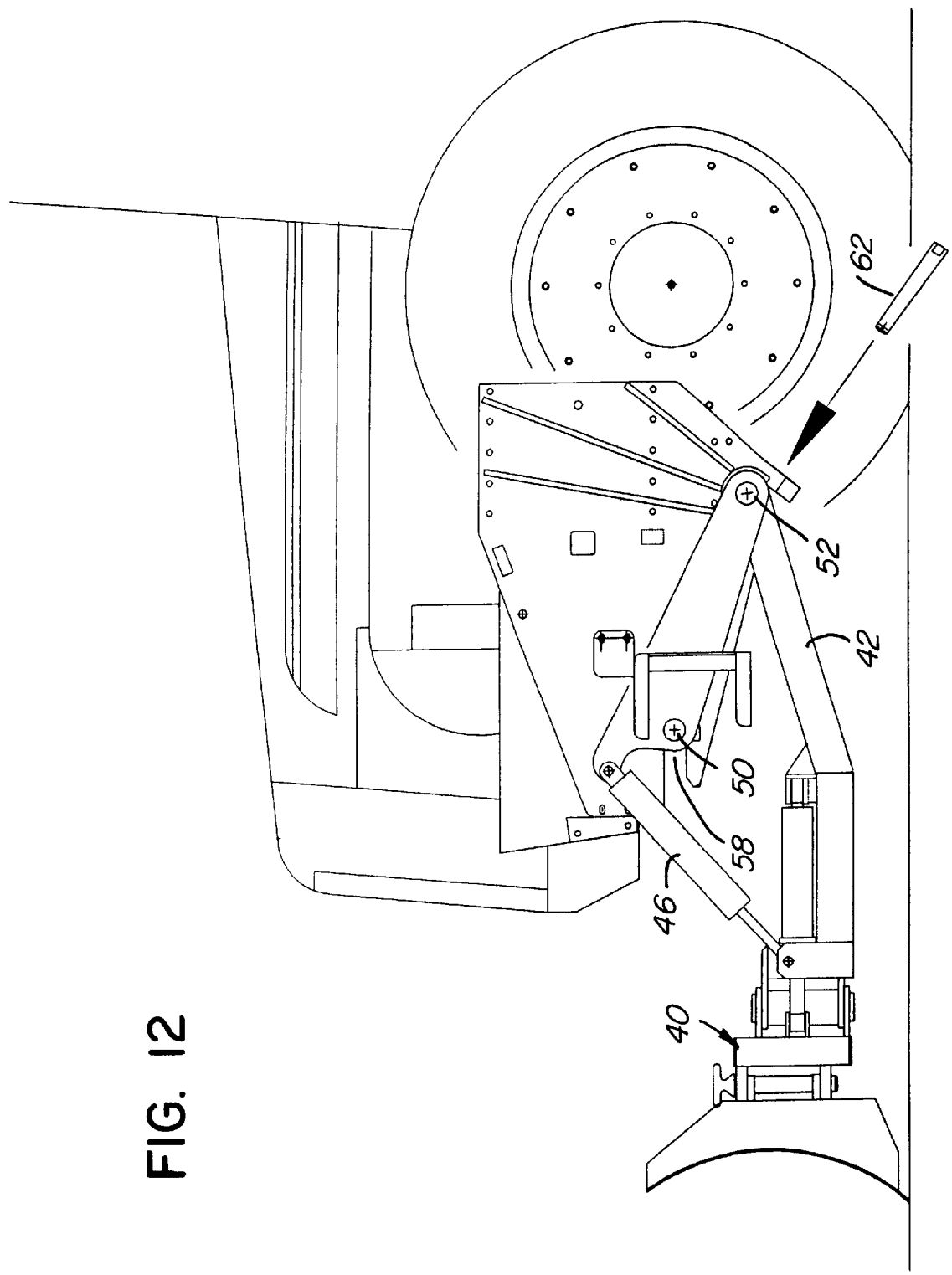
FIG. 12 is a view similar to FIG. 11 but showing the two assemblies in fully engaged position ready for operation.

In the embodiment shown in FIGS. 10, 11 and 12, the arrangement is substantially the same as that in FIGS. 7, 8 and 9 with the exception that the jack 48 is omitted from the unit and the lower or rear latch pin receiving socket 60 in the side plates 54 has been oriented so that it faces downwardly and forwardly around a radius centered on the upper or forward latch bar 50.

In this arrangement, the assembly 40 is aligned with the receiving sockets 58, 60 on the tractor 56 and the operator drives the tractor close enough to connect all the hydraulics. Using the hydraulics, the operator then extends the hydraulic cylinders 46 to pivot the front latch bars 50 up to match the front receiving sockets 58 on the tractor side plates 54 and then the operator drives the tractor forward, slowly retracting the hydraulic cylinders 46 until the assembly 40 is fully engaged with the side plates 54 as shown in FIG. 12. By retracting these cylinders 46, the rear portion of the push frame 42 pivots upwardly so that the latch bars 50, 52 are received in the sockets 58 and 60, the latter from below.

The assembly is then secured using the tapered pins 62 and the unit is fully operational.

To detach the unit, the above steps are reversed.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

What is claimed is:

1. A quick-connect dozer frame assembly for detachable securement to a tractor type of vehicle, said dozer frame assembly comprising:

an implement-supporting front section and a push frame rear section;

first connecting members mounted on said push frame rear section;

second connecting members adapted for mounting on a frame of said vehicle at locations thereon so as to be engagable with said first connecting members on said push frame rear section when said vehicle is moved into an operative connecting position with said dozer frame assembly;

means for locking said first and second connecting members in their position of engagement; and wherein said first connecting members are a pair of hook members, one on each side of said push frame rear section, and a bar-receiving pocket at an inner, terminal end of said push frame rear section, said second connecting members comprising a pair of latching bars, one on either side of the frame of said vehicle for engaging the hook members on said frame assembly, and a rear latching bar secured to the frame of said vehicle adjacent the rear thereof and extending forwardly to engage said bar receiving pocket on the inner terminal end of said push frame rear section.

2. A frame assembly according to claim 1 wherein said locking means comprises a locking pin securing said rear latching bar in said receiving pocket on the push frame rear section.

3. A frame assembly according to any one of the preceding claims 1–2 including means for raising said frame assembly to a connecting elevation.

\* \* \* \* \*